United States Patent [19] [11] 4,424,672
Kalhorn [45] Jan. 10, 1984

[54] HYDRAULIC POWER STEERING SYSTEM
[75] Inventor: George P. Kalhorn, Dubuque, Iowa
[73] Assignee: Deere & Company, Moline, Ill.
[21] Appl. No.: 385,368
[22] Filed: Jun. 7, 1982
[51] Int. Cl.³ .............................................. F15B 9/10
[52] U.S. Cl. ...................................... 60/385; 91/518; 180/152
[58] Field of Search .................. 60/385, 386; 180/152, 180/153; 91/517, 518

[56] References Cited
U.S. PATENT DOCUMENTS
3,720,282 3/1973 Bianchetta et al. ................. 180/153
4,003,202 1/1977 Becker .................................. 60/385
4,161,865 7/1979 Day ....................................... 60/385

OTHER PUBLICATIONS
STSG–John Deere Industrial Service Training Student Guide 2602-2 (Jun. 1981) Level 3 Service Technician–762A.

Primary Examiner—Robert E. Garrett
Assistant Examiner—John M. Husar

[57] ABSTRACT

A hydraulic power steering system has a steering valve which operates in accordance with steering input signals generated by a steering wheel operated metering pump and follow-up signals generated by a pair of follow-up cylinders to effect a desired turn. The steering valve acts in response to a relatively large signal, representing a desired sharp or full turn, to interrupt or block the follow-up signal whereby sharp turns may be accomplished without requiring as many turns of the steering wheel as would be necessary if follow-up flow were nullifying the input signal.

6 Claims, 1 Drawing Figure

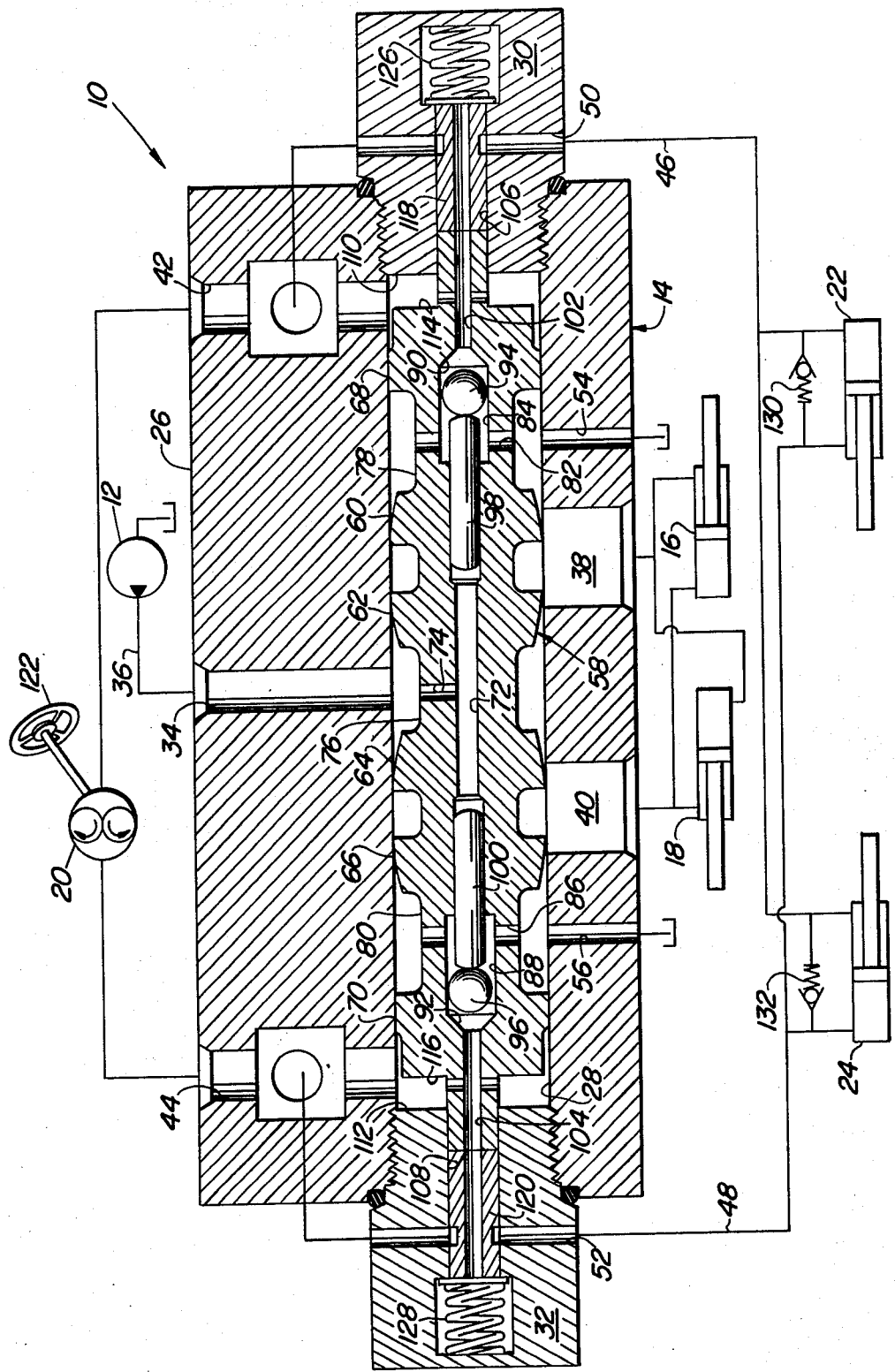

HYDRAULIC POWER STEERING SYSTEM

BACKGROUND OF THE INVENTION

The present invention relates to hydraulic power steering systems and more specifically relates to follow-up circuitry for such systems.

It is desirable to have steering systems which provide fine steering control for minor steering corrections, especially at high speeds, while providing steering control for making sharp turns without requiring a relatively large number of turns of the steering wheel from lock-to-lock.

A known steering system, which embodies a metering pump for producing a steering input signal across a steering valve and a follow-up cylinder for producing a follow-up signal to nullify the input signal once a desired turn is made, has the characteristic of providing fine steering control, however it does not permit sharp turns to be made without excessive steering wheel motion. While the number of turns lock-to-lock of this known system is determined by the relative size of the metering pump to the follow-up cylinder displacement and can therefore be decreased by increasing the metering pump size or decreasing the follow-up cylinder displacement, such changes in size would result in a loss of fine steering control.

SUMMARY OF THE INVENTION

According to the present invention, there is provided an improved follow-up circuit for a hydraulic power steering system.

Specifically, the hydraulic power steering system of the present invention includes a metering pump for imposing a steering input signal on a steering control valve and includes a follow-up cylinder for providing a flow of follow-up signal fluid to nullify the input signal. However, the control valve is constructed so as to interrupt the flow of follow-up signal fluid when the control valve is shifted in response to receiving an input signal of a magnitude for effecting a sharp turn. Thus, with the follow-up signal terminated, the input signal is not working against the follow-up signal and a sharp turn may be accomplished without excessive steering wheel motion.

A broad object of the invention is to provide a hydraulic power steering system which exhibits both the characteristic of fine steering control for making minor steering corrections and the characteristic of permitting sharp turns without requiring excessive steering wheel motion.

A more specific object of the invention is to provide a steering system employing a metering pump and a follow-up cylinder for respectively creating input and follow-up signals for controlling a steering control valve and having their relative sizes selected for providing fine steerig control whereby minor steering corrections may be made and to provide the steering control valve with means for interrupting the follow-up signal flow in response to the control valve receiving an input signal indicative of a desired sharp turn whereby a sharp turn may be accomplished without excessive turning of the steering wheel.

These and other objects will become apparent from a reading of the ensuing description together with the appended drawing.

The sole FIGURE is a schematic representation of a hydraulic power steering system embodying a control valve constructed in accordance with the principles of the present invention.

DESCRIPTION OF THE PREFERRED EMBODIMENT

Referring now to the drawing, therein is shown a hydraulic power steering system indicated in its entirety by the reference numeral 10. The system 10 includes a power circuit comprising an engine-driven steering pump 12, a control valve 14 and a pair of steering actuators or cylinders 16 and 18. The control valve 14 is pilot actuated through means of a control circuit comprising a manually operable, reversible metering pump 20 and through means of a follow-up circuit comprising a pair of follow-up cylinders or actuators 22 and 24.

The control valve 14 includes a valve body 26 defining a valve bore 28 having its opposite ends closed by a pair of end caps or plugs 30 and 32. Intersecting the bore 28 at an intermediate location therealong is a steering fluid inlet port 34 which is connected, as by a supply conduit 36, for receiving fluid from the steering pump 12. Intersecting the valve bore 28 at locations on opposite sides of the inlet port 34 are respective steering cylinder work ports 38 and 40. The work port 38 is connected to the rod end of the cylinder 16 and the head end of the cylinder 18 while the work port 40 is connected to the rod end of the cylinder 18 and the head end of the cylinder 16. A pair of pilot or control fluid ports 42 and 44 respectively intersect the bore 28 at locations adjacent opposite ends thereof and are connected for receiving fluid from the metering pump 20. The head end of the follow-up cylinder 22 and the rod end of the follow-up cylinder 24 are connected, as by a conduit 46, to the pilot fluid port 42 while the rod end of the follow-up cylinder 22 and the head end of the follow-up cylinder 24 are connected, as by a conduit 48, to the pilot fluid port 44. Respectively forming parts of the conduits 46 and 48 are passages 50 and 52 which are located in the plugs 30 and 32 in crosswise relationship to the axis of the valve bore 28. Located between the work port 38 and the control port 42 is a sump port 54 and located between the work port 40 and the control port 44 is a sump port 56.

A control valve element in the form of a valve spool 58 is reciprocably mounted in the valve bore 28. The valve spool 58 is illustrated in a central, neutral position wherein a first pair of lands 60 and 62 are located on opposite sides of the work port 38 and a second pair of lands 64 and 66 are located on opposite sides of the work port 40. Thus, the flow of fluid to the steering cylinders 16 and 18 is blocked. Also, a land 68 is positioned between the control port 42 and the sump port 54 and a land 70 is positioned between the control port 44 and the sump port 56. An axial passage 72 extends from end-to-end through the spool 58. Located centrally between the lands 62 and 64 is a radial passage 74 which connects a central portion of the passage 72 in fluid communication with a recess 76 defined between the lands 62 and 64, the recess 76 being located for continuous fluid communication with the inlet port 34 throughout the range of movement of the valve spool 58. A pair of annular recesses 78 and 80 are respectively defined between the lands 60 and 68, and between the lands 66 and 70. These recesses 78 and 80 are respectively arranged to remain in constant communication with the sump ports 54 and 56 throughout the range of movement of the valve spool 58. A first radial passage 82 connects the recess 78 to a checkball cage 84, formed as an enlargement of the passage 72, while a second radial passage 86 connects the recess 80 to a checkball cage 88 which is likewise formed as an enlargement of the passage 72. Respective outer ends of the cages 84 and 88 define valve seats 90 and 92, and a pair of checkballs 94 and 96 are respectively located for engagement with the seats 90 and 92. Reciprocably mounted in the axial passage 72 between the radial passages 74 and 82 is a pin 98 which operates to seat the ball 94 anytime fluid pressure exists at the inlet port 34. Similarly, a pin 100 is reciprocably mounted in the axial passage between the radial passages 74 and 86 for seating the ball 96 against the seat 92 anytime pressure fluid exists at the inlet port 34. Control fluid relief passages 102 and 104 at the opposite ends of the valve spool act, when the balls 94 and 96 are unseated, to respectively connect the control ports 42 and 44 to the sump ports 54 and 56 by way of respective outer ends of the passage 72, the cages 84 and 88 and the radial passages 82 and 86.

The end caps or plugs 30 and 32 are respectively provided with bores 106 and 108 which are in axial alignment with the valve spool 58 and respectively intersect the passages 50 and 52. The end caps 30 and 32 define respective stop surfaces 110 and 112 against which respective shoulders 114 and 116 at the opposite ends of the spool bear when the spool is in its extreme positions. Respectively reciprocably mounted in the bores 106 and 108 are hollow pins 118 and 120 which are arranged for being engaged by the valve spool 58 and moved into blocking relationship to the passages 50 and 52 when the spool 58 is caused to move to opposite extreme positions as would be the case when a steering wheel 122, which is coupled to the metering pump, is turned to one lock or the other for effecting a sharp turn. Centering springs 126 and 128 are respectively mounted in the end caps 30 and 32 for returning the valve spool 58 to its centered position anytime a pressure balance exists across the valve spool. A pair of one-way relief valves 130 and 132 are respectively connected across the head and rod ends of the follow-up cylinder 22 and across the head and rod ends of the follow-up cylinder 24 and operate to permit follow-up fluid to be circulated between the opposite ends of the cylinders respectively whenever the follow-up circuit passage portions 50 and 52 are blocked.

The operation of the invention is as follows. When the engine of the vehicle embodying the system 10 is started, the steering pump 12 will operate to supply pressure fluid to the inlet port 34 and thus, fluid pressure enters the port 74 and acts to urge the pins 98 and 100 oppositely to seat the balls 94 and 96 so as to block fluid communication between the control ports 42 and 44 and the sump ports 54 and 56.

Then, if it is desired to make a gradual turn, the steering wheel 122 is rotated a small amount in the desired direction to operate the metering pump 20 so as to create an input control signal at one or the other of the control ports 42 or 44. For example, if the control signal is directed to the port 42, a pressure imbalance will be created across the valve spool 58 and the latter will shift leftwardly. This leftward movement will result in the supply inlet port 34 being connected to the work port 40 and in the sump port 54 being connected to the work port 38. Thus, the steering cylinder 16 will be extended and the steering cylinder 18 will be retracted. Such operation of the steering cylinders causes the follow-up cylinders 22 and 24 to be respectively extended and retracted resulting in a follow-up signal flow being generated which travels to the control port 44 by way of the conduit 48. Because the control input signal generated by the metering pump 20 was small, the leftward movement of the spool 58 will not have been sufficient to move the pin 120 into blocking relationship to the passage portion 52 and the follow-up signal will act on the left end of the spool 58 and nullify the signal acting on its other end once the steering cylinders have turned the vehicle an amount corresponding to the input control signal.

On the other hand, if the input control signal generated at the port 42 were of a magnitude sufficient for effecting a sharp turn of the vehicle, as would be the case if the steering wheel 122 were turned to one of its lock positions, then the spool 58 would be moved leftwardly to an extreme position wherein its surface 116 abuts the stop surface 112 afforded by the end cap. Again the steering cylinders 16 and 18 will be respectively extended and retracted and effect respective extension and retraction of the follow-up cylinders 22 and 24 resulting in fluid being displaced therefrom to thereby generate a follow-up signal in conduit 48. However, this time the pin 120 will have been shifted sufficiently toward the left that it will interrupt or block the follow-up signal from reaching the control port 44. The fluid displaced by the follow-up cylinders 22 and 24 will then pass across the relief valve 132 to the respective opposite ends of the cylinders. This results in a full turn being accomplished without requiring an excessive number of turns of the steering wheel.

The operation of the invention for effecting turns in the opposite direction is thought to be evident from the foregoing and for the sake of brevity is not described.

I claim:

1. In a hydraulic power steering system including a source of power steering fluid, a double-acting steering cylinder, a steering control valve connected to the source and steering cylinder and having a spool element normally located in a neutral position blocking the flow of fluid to and from the steering cylinder, a hand-operated metering pump coupled across the spool element by control circuitry and operable in opposite directions to respectively impose oppositely acting input signals on the spool element for causing the latter to shift in opposite directions from its neutral position so as to respectively effect extension and retraction of the steering cylinder, with the amount of extension or retraction being directly proportional to the amount of fluid displaced by the metering pump, a follow-up cylinder connected across said valve element by follow-up circuitry for producing a follow-up signal, in response to operation of the steering cylinder, which acts in opposition to an input signal then acting on the valve element, the improvement comprising:

blocking means operatively associated with the valve element and the follow-up circuitry and responsive to the movement of the valve element for interrupting fluid communication between the follow-up cylinder and the valve element only when the latter shifts to opposite extreme positions for effecting sharp turns.

2. The power steering system defined in claim 1 wherein said follow-up circuitry includes first and second passage portions respectively in fluid communication with opposite ends of the follow-up cylinder and located in the steering control valve in the proximity of the valve element; said blocking means including at least first and second blocking portions respectively arranged for reciprocable movement into blocking relationship to said first and second passage portions; and said blocking means further including engageable means disposed for being engaged by said valve element and shifted into blocking relationship to said first and second passage portions respectively in response to the valve element being shifted to said opposite extreme positions.

3. The power steering system defined in claim 2 wherein said first and second passage portions are respectively arranged in the control valve at opposite ends of and in alignment with the valve element; first and second bores respectively intersecting said first and second passage portions; said first and second blocking portions being respectively defined by first and second pins reciprocably mounted in the first and second bores and having respective first ends thereof disposed for engagement by said valve element respectively when the latter is disposed in its opposite extreme positions so as to move the first and second pins into blocking relationship to the first and second passage portions.

4. In a hydraulic power steering system including a hand-operated metering pump for creating steering input signals, a steering valve having element means shiftable in response to an input signal, a steerig cylinder having opposite ends respectively coupled to the steering valve, a steering fluid supply pump coupled to the steering valve and a follow-up cylinder having its opposite ends coupled to the steering valve for conveying a follow-up signal to the element means for nullifying the effects of an input signal once the steering cylinder has been operated to an extent corresponding to the magnitude of an input signal, the improvement comprising:

said element means including first and second element portions shiftable to respective extreme positions upon the element means being shifted to opposite extreme positions in response to receiving steering input signals of a magnitude for effecting sharp right or left turns; and said follow-up cylinder being connected to the element means by first and second passage portions that are respectively interrupted by said first and second element portions so as to interrupt the follow-up signal when sharp turns are being made.

5. In a hydraulic power steering system including a steering control valve having a valve body defining a valve bore including first and second pilot-pressure chambers, a valve element mounted in the bore for shifting oppositely therein respectively in response to pressure signals received at said first and second pilot-pressure chambers, a manually-operable steering command signal generating means connected to said first and second pilot-pressure chambers for selectively effecting a desired pressure therein;

a source of steering fluid pressure connected to the control valve, a power steering cylinder means having right- and left-steer chambers connected to the steering control valve for respectively receiving steering fluid from the source when the valve element shifts in response to steering command signals received at said first and second pilot-pressure chambers, a follow-up signal generating means connected to the first and second pilot-pressure chambers for automatically cancelling out a previously received command signal once the power steering cylinder means has moved an amount corresponding to the magnitude of the previously received command signal, the improvement comprising:

a follow-up signal blocking means operatively conneecteed to the steering valve for preventing the flow of follow-up fluid to said first and second pilot-pressure chambers in response to the valve element being shifted an amount for effecting operation of the steering cylinder means for causing a sharp turn.

6. In a hydraulic power steering system including a pilot-operated steering valve including a valve body defining a valve bore intersected by a steering fluid supply port, by first and second steering cylinder work ports respectively disposed on opposite sides of the supply port, by first and second sump ports respectively disposed on opposite sides of the supply port at locations beyond the first and second work ports and first and second pilot-fluid ports respectively located on opposite sides of the supply port at locations beyond the first and second pilot-fluid ports, a spring-centered valve spool reciprocably mounted in the bore and including lands arranged for blocking fluid communication between the supply port and the first and second work ports when the spool is in a centered neutral position and for establishing fluid communication between the supply port and the first and second work ports respectively when the spool is shifted oppositely from its neutral position to right and left turn positions, a hand-operated metering pump connected to said first and second pilot-fluid ports, a steering fluid supply pump connected to said supply port, at least one double-acting steering cylinder having first and second ports respectively connected to the first and second work ports; and at least one double-acting follow-up cylinder having first and second ports respectively connected to the first and second pilot-fluid ports, the improvement residing in the steering control valve and comprising:

first and second follow-up fluid passages respectively located in the valve body adjacent opposite ends of the valve body;

said first and second ports of the follow-up cylinder being respectively connected to the first and second pilot-fluid ports by way of first and second conduit means including said first and second follow-up fluid passages;

first and second bores respectively located in opposite ends of the valve body in alignment with the valve bore and each having opposite ends respectively terminating at the valve bore and at a respective one of the first and second follow-up passages; and first and second pins respectively reciprocably mounted in the first and second bores and being operative for being selectively contacted and shifted into blocking relationship to the first and second follow-up passages only when the valve element is shifted to opposite extreme positions for effecting sharp turns.

* * * * *